(12) United States Patent
Kuikka

(10) Patent No.: US 7,092,004 B2
(45) Date of Patent: Aug. 15, 2006

(54) METHOD AND ARRANGEMENT FOR INSPECTING SEWER PIPES

(76) Inventor: Sakari Kuikka, Maaniituntie 16, FIN-01900 Nurmijärvi (FI)

( * ) Notice: Subject to any disclaimer, the term of this patent is extended or adjusted under 35 U.S.C. 154(b) by 509 days.

(21) Appl. No.: 10/429,669

(22) Filed: May 6, 2003

(65) Prior Publication Data

US 2004/0020270 A1 Feb. 5, 2004

(30) Foreign Application Priority Data

May 6, 2002 (FI) ................... 20020854

(51) Int. Cl.
*H04N 7/18* (2006.01)

(52) U.S. Cl. .............. 348/82; 348/84; 348/85

(58) Field of Classification Search ............. 348/80–90
See application file for complete search history.

(56) References Cited

U.S. PATENT DOCUMENTS

| | | | |
|---|---|---|---|
| 3,739,089 A | 6/1973 | Latall | |
| 3,885,091 A | 5/1975 | Fish et al. | |
| 4,107,738 A * | 8/1978 | Van Norman | 348/84 |
| 4,651,558 A * | 3/1987 | Martin et al. | 73/40.5 R |
| 4,800,104 A | 1/1989 | Cruickshank | |
| 5,650,813 A | 7/1997 | Gilblom et al. | |
| 6,111,600 A * | 8/2000 | McLeod et al. | 348/84 |
| 6,138,697 A | 10/2000 | Horger et al. | |
| 6,958,767 B1 * | 10/2005 | Olsson et al. | 348/82 |

FOREIGN PATENT DOCUMENTS

| | | |
|---|---|---|
| DE | 36 14046 A1 | 11/1986 |
| DE | 44 17 265 C1 | 8/1995 |
| DE | 196 19 326 | 11/1997 |
| FR | 2 768 214 | 3/1999 |
| FR | 2784908 | 4/2000 |
| JP | 58-223113 | 12/1983 |
| JP | 11-114513 | 4/1999 |

OTHER PUBLICATIONS

JP-11-114513, (**English translation).

* cited by examiner

*Primary Examiner*—Andy Rao
(74) *Attorney, Agent, or Firm*—Young & Thompson

(57) ABSTRACT

The invention relates to an arrangement for inspecting sewer pipes or the like. The arrangement comprises a flush unit (8) that has ample room to move in a sewer pipe (10) and at the proximal end ($E_P$) thereof substantially backwards pointing nozzles (18), a flexible flush hose (9) and liquid pressurizing means (20) in order to create a flow of the pressurized liquid ($V_H$) through the nozzles to the sewer pipe. In addition, the arrangement comprises a camera unit n (1) including: a fish-eye lens or another lens, and in front of the lens a rotation symmetrical curved mirror, these constituting optical image forming means (5), a number of radially outwards pointed lenses in order to create an image of the circumferential zone ($K_i$) on the inner surface of the sewer pipe; an image detector and illumination means (2). Further the arrangement includes automatic locking means (4a, 4b) for a mutual, detachable fastening of the camera unit (1) and the flush unit (8) successively in order to form a scanner combination (13), so that the optical image forming means (5) are located at the distal end ($E_D$) of said combination.

19 Claims, 5 Drawing Sheets

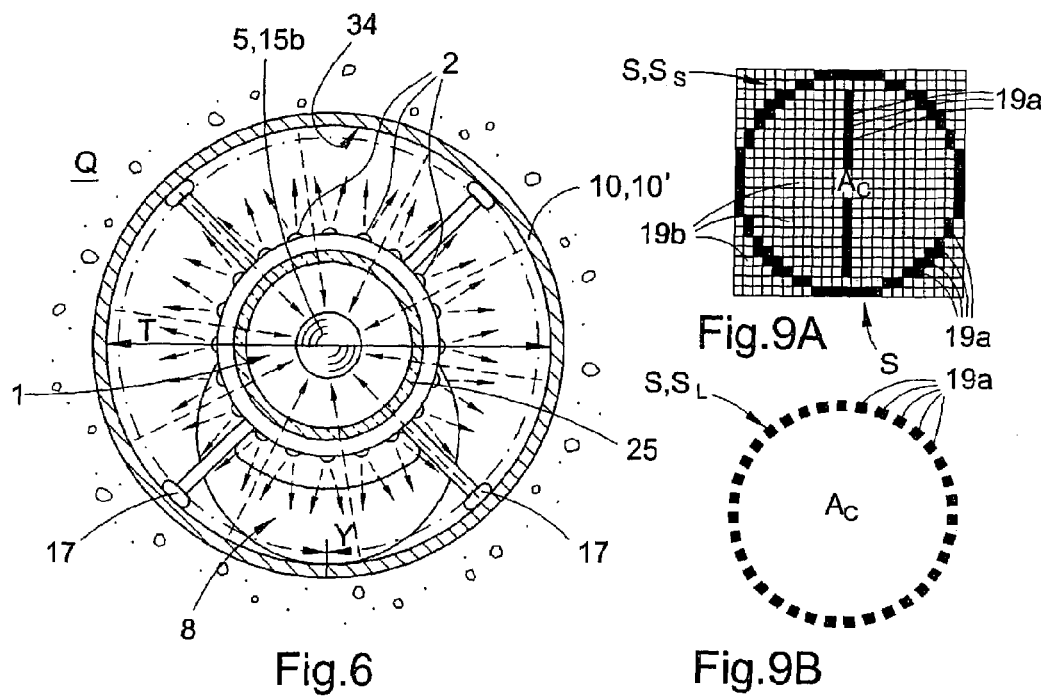
Fig.6
Fig.9A
Fig.9B
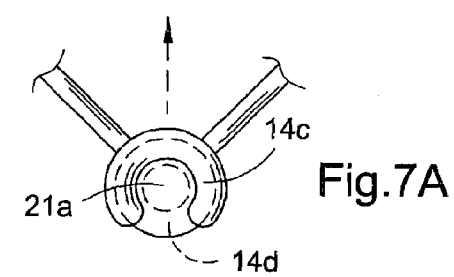
Fig.7A
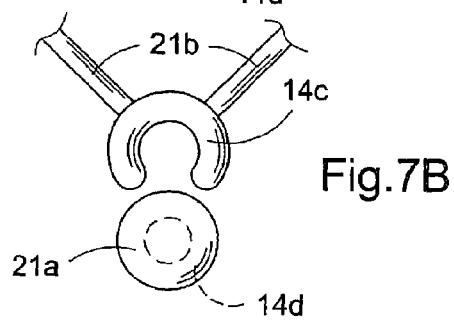
Fig.7B
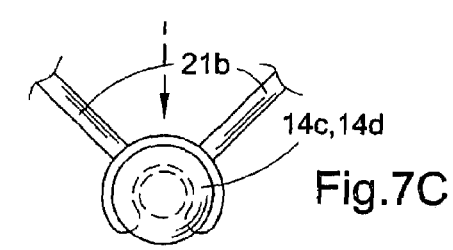
Fig.7C
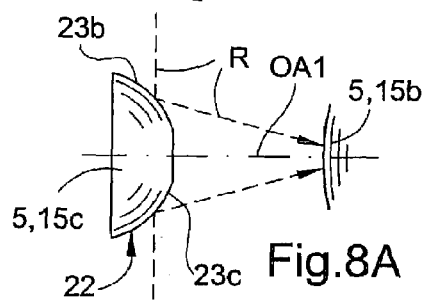
Fig.8A
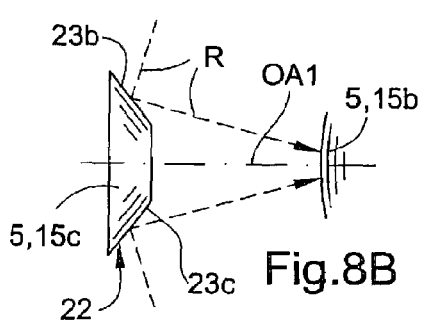
Fig.8B
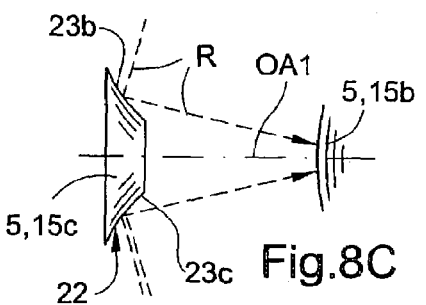
Fig.8C

METHOD AND ARRANGEMENT FOR INSPECTING SEWER PIPES

The invention relates to an arrangement for inspecting sewer pipes that are substantially transversal to gravity, said arrangement comprising: a flush unit that has ample room to move in the sewer pipe, and in the proximal end of said flush unit, nozzles that are directed substantially backwards, a flexible flush hose, the first end being attached to the flush unit and the second end extending to outside the sewer pipe; liquid pressurizing elements that are connected to one end of the flush hose in order to create a pressurized liquid flow along the flush hose to the flush unit and further, through the nozzles, to the sewer pipe; a camera unit that can be installed in the flush unit and comprises optical image formation means and an image detector, as well as illuminating elements and a power source, the optical image formation means being directed in an substantially opposite direction than the nozzles. The invention also relates to a corresponding method for inspecting sewer pipes that are connected to sewage tanks.

In the prior art it is known to clean sewer pipes that are placed for instance underground of dregs etc. that are accumulated in the course of time by means of cleaning means including a flush hose to be inserted in the sewer pipe itself, and a nozzle unit provided at the end of the flush hose. When pressurized flushing water is fed along the flush hose at the same time as the nozzle unit is allowed to move, or as the nozzle unit is moved along the sewer, the flushing water is discharged through the ejectors of the nozzle unit, it detaches the dirt accumulated on the inner walls of the sewer pipe and transports it, along with the water, out of the sewer pipe owing to the inclination of the pipe. This kind of a flushing nozzle unit is described as prior art for instance in the publication JP-11-114513. The problem here is to ensure that the sewer cleaning result is satisfactory. For this purpose, it is known to insert into the sewer pipe after the cleaning operation described above, i.e. after the cleaning device is removed from the sewer, through the same manhole a camera unit including conveyor means provided with a motor, illumination means, the camera proper and a cable that connects the camera unit to an arrangement provided above ground, from which arrangement there is supplied electric power to the motor of the camera unit, to the illumination means and to the camera, and from which the camera unit is controlled and to which the video image material shot by the camera is recorded on a video tape. In this way the cleaning result can be inspected, and at the same time the possible needs for reparation of the sewer pipe are defined. However, this system requires that the site is visited by two separate teams, i.e. first the cleaning team with their equipment, and then the inspection team with their equipment, which takes up a lot of time and causes a lot of expenses. Really remarkable extra expenses are caused if the cleaning team must return to the site because the inspection shows that additional cleaning is necessary.

The above described problems have been attempted to be solved by means of a combination of a nozzle unit and a CCD miniature camera described in the publication JP-11-114513. Similar combinations of cleaning device and camera are also described in the publications DE-36 14 046 and FR-2 784 908. All of these devices are provided with a cleaning unit to be inserted in the sewer pipe, which cleaning unit is by a combined pressurized water hose—electric/signal cable connected to a maintenance car located above ground, and at the proximal ends of said cleaning unit there are arranged flush nozzles pointing in the direction of said hose-cable combination, i.e. backwards. In addition, the cleaning units are provided at their distal ends with a video camera and illumination means that are directed in the opposite direction than the hose-cable, i.e. forwards. The publication U.S. Pat. No. 6,138,697 discloses an arrangement that represents a similar type in other respects, except that it may include two video cameras pointing at opposite directions, and the image(s) from said cameras are transmitted wirelessly to a monitor located above ground. Said devices are used so that the sewer pipe is first cleaned in the way described above, in which case the pressurized water gushing out of the backwardly pointing nozzles of the cleaning unit moves the cleaning unit forwards at the same time as the gushing water, when hitting the walls of the sewer pipe, detaches impurities and other detachable matter from said walls. When necessary, said cleaning operation can be repeated for a given sewer section for one or several times by pulling the cleaning unit backwards by transmission of the hose-cable, and by allowing it again to slide forwards by the recoil force of the pressurized water jet. When the sewer is cleaned, the inner walls of the sewer are inspected. According to the publications JP-11-114513 and DE-36 14 046, the water jets, i.e. the pressurized water supply through the nozzles is stopped for drying, and during the video shooting the cleaning unit is pulled backwards by intermediation of the hose-cable combination. On the other hand, according to the publications U.S. Pat. No. 6,138,697 and FR-2 784 908, the supply of the water jets, i.e. pressurized water through nozzles, i.e. the water recoil force, is allowed to transport the cleaning unit forwards for shooting. In all said publications, the camera unit is a regular video camera, except for its water tightness feature, and the created image is transmitted along the hose-cable to the monitor of a maintenance car located above ground, and can also be recorded on video tape in said maintenance car. The camera is attached to the cleaning unit throughout the sewer cleaning operation, and the camera lens is often soiled during the cleaning, which means that the quality of the image obtained from the video camera is weakened. In order to solve this problem, the publication FR-2 784 908 suggests at the distal end of the cleaning unit tiny additional water jets that are directed at least in the lens shielding glass, whereas the publication U.S. Pat. No. 6,138,697 suggest the use of a mechanically operated wiper. In addition to the problems mentioned above, said known arrangements have at least the following drawbacks. Firstly, because on the bottom of the sewer pipe, there always is at least a certain amount of dirty sewage water, and the sewer pipe may be even half-full of dirty water, the camera does not see the area on the sewer pipe bottom. Secondly, the image of the sewer pipe inner wall rendered by the video camera is extremely difficult to interpret, wherefore the interpretation takes up a lot of working time and requires a vast experience of the person responsible for the task.

In the publication U.S. Pat. No. 4,107,738, there is described a combination of a TV camera and a hydraulic jet nozzle, where the pressurized water jets are directed from the combination to the direction of the water supply hose or to the side thereof, i.e. backwards, whereas the camera is located at the front of the arrangement and faces in the opposite direction than said water jets. In addition, it is pointed out in the publication that the jets move the arrangement in one direction, and that the arrangement is moved by pulling in the other direction, and that the inside of the pipe can be shot in both motional directions of the arrangement. The type of the employed TV camera is not specified in the publication; it is only stated that the camera is connected by a closed-circuit connection—that proceeds along with the water supply hose—to a receiver located above ground, in which receiver the obtained image can be observed. According to the publication, the nozzle unit containing the jet nozzles is attached by a threaded connection to a swivel connector fixed by a bar to the frame or skid of the TV camera. Apparently the skid and the camera constitute a fixed unit. The publication neither mentions the distance between the nozzles and the camera nor the pulling speed of the arrangement, but gives an example of water pressure, which is 2000 p.s.i. This arrangement has the same problems as the ones already dealt with above.

Consequently, the object of the present invention is to achieve an arrangement and a method for evaluating the condition of for instance sewers, i.e. the inner surfaces, possible extensions, branching spots etc. of sewer pipes or pipes put in other usage, such as gas and oil pipes etc., so that said evaluation process could produce accurate and easily interpreted data along the whole circumference of the pipe. Another object of the invention is to achieve this type of an arrangement and method whereby it could be possible to avoid complicated cable systems between the camera arrangement located inside the pipe and the maintenance car or other inspection equipment located above ground and used by the inspection team. A third object of the invention is to achieve this type of an arrangement and method that could ensure that the camera optics remain sufficiently clean, so that the obtained image signal could be converted into image data that renders a sufficiently sharp image. Yet another object of the invention is to achieve this type of an arrangement and method that could be easily connected to other arrangements used in this field of technology, so that the repay period of the invested expenses would be as short as possible.

The problems described above can be solved and the above defined objects achieved by means of an arrangement according to the invention, characterized by what is set forth in the characterizing part of claim 1, as well as by means of a method according to the invention, characterized by what is set forth in the characterizing part of claim 16.

It is a substantial advantage of the invention that of the inner surface of the pipe, there is obtained an extremely high-quality image that is easily interpreted. First of all, the obtained image continues homogeneously and without interruptions along the whole length of the pipe, because the image is created by continuously and evenly scanning the inner surface of the pipe, in which case any measures or dimensions apparent from the image, for example impurities or damages or other defects in the pipe walls, as well as their mutual distances and locations in the pipe, always correspond in the same scale to real impurities, damages and other defects contained in the pipe, irrespective of their location or position. Thus, on the basis of the obtained image, there can be accurately defined the size, degree and location of the detected impurities, damages or defects for possible repair operations. Secondly, the quality of the obtained image is extremely sharp and accurate, because the viewing angle and the shooting distance remain the same throughout the process. Thus the focusing can be performed at exactly the defined distance. As the viewing angle remains the same, typically completely or nearly perpendicular to the pipe wall, the interpretation and evaluation of impurities, damages and other defects becomes remarkably easier and more efficient than in the prior art. From FIG. 12, representing an image obtained by means of the invention, it is understood that each area A1 and A2 that is located at different spots in the lengthwise direction of the pipe, and more precisely each point of each area, is illustrated in the picture as seen at substantially right angles against the wall and from the same distance, which is roughly half of the pipe diameter. On the other hand, from FIG. 13 that represents the prior art it is understood that the pipe area A5 located near the camera is seen at a blunter angle, for instance at an angle of 60° between the pipe wall and the viewing angle, and the pipe area A6 located further away from the camera is seen at a sharper angle, for instance at an angle of 10° between the pipe wall and the viewing angle, in which case the comparison of the impurities and damages is extremely difficult. Likewise, from FIG. 13 representing the prior art it is understood that when the area A5 located near the camera is placed for example at the distance of 50 cm from the camera, the area A6 located further away from the camera is at the distance of about 200 cm from the camera, in which case both areas cannot possibly be pictured accurately. Another substantial advantage of the invention is that an extremely high-quality image is obtained along the whole circumferential dimension of the inner surface of the pipe wall, because any sewage possibly located on the pipe bottom is in most cases removed from the area shot by the camera by using a flush unit connected to the camera unit. From FIG. 12, which thus represents the image obtained by means of the invention, there can accurately and in great detail be seen the area A3 on the pipe bottom that was cleared of the sewage, as well as naturally the area A4 of the top part of the pipe. On the other hand, from FIG. 13, which represents an image obtained by means of the prior art, there is seen the sewage layer A7, which completely hinders the view to the bottom area of the pipe. A third advantage of the invention is that by means of scanning, even the image file representing a long pipe is made so small that it can be recorded in the memory of the camera unit, in which case there are not needed for instance data transmission cables from the camera unit to above ground. A fourth advantage of the invention is that by connecting the camera unit to the flush unit, there is avoided the need for transmission equipment for the camera unit, such as a motored conveyor mechanism that would otherwise be compulsory, when by pulling the water supply hose of the flush unit there is created a backward motion, and by means of the recoil force of the water ejected from the nozzles of the flush unit there is created a forward motion, in which case there is no need, among others, for electric cables from the camera unit to above ground. By means of the combination of the camera unit and the flush unit, i.e. the scanner combination, there are thus obtained two advantages independent of each other: an unobstructed view to the whole of the pictured surface and motion in both opposite directions without any specific auxiliary devices. A fifth advantage of the invention is that by inserting the camera unit into the pipe only for the duration of the shooting, there is for the most part avoided the soiling of the lens or other corresponding element of the camera unit. In the arrangement according to the invention, the lens or other optics can, when necessary, be easily cleaned before the camera unit is inserted in the pipe, and any remarkable soiling of said optics is extremely improbable, because the pipe is already cleaned or flushed prior to starting the shooting operation. On the other hand, the devices representing the prior art move in the pipe throughout the whole cleaning step, whereafter the camera lens is most certainly really soiled and requires specific cleaning procedures in order to enable the shooting. On the basis of the images obtained by means of the invention, it is easy to define and measure the required further operations, such as additional cleanings and/or repairs and/or relinings of the pipes.

The invention is explained in more detail below, with reference to the appended drawings.

FIGS. 5 and 6 illustrate a second embodiment of the camera unit according to the invention and its mechanical connection to the flush unit, seen from the side, in the same view as in FIG. 4, and as a cross-section along the plane I—I of FIG. 5.

FIGS. 7A–7C illustrate the locking steps of the mechanical connection of FIG. 5, seen from the direction II of FIG. 5.

FIGS. 8A–8C illustrate three different forms of the mirror belonging to the second embodiment of the camera unit according to the invention, seen from the side, in the same view as in FIG. 5, but in a larger scale.

FIGS. 9A and 9B illustrate an area cell used in the camera unit according to the invention, as well as a part of the image area utilized thereof, and alternatively a circular line cell used in the camera unit according to the invention, along the plane III—III of FIG. 4.

Figure 1:
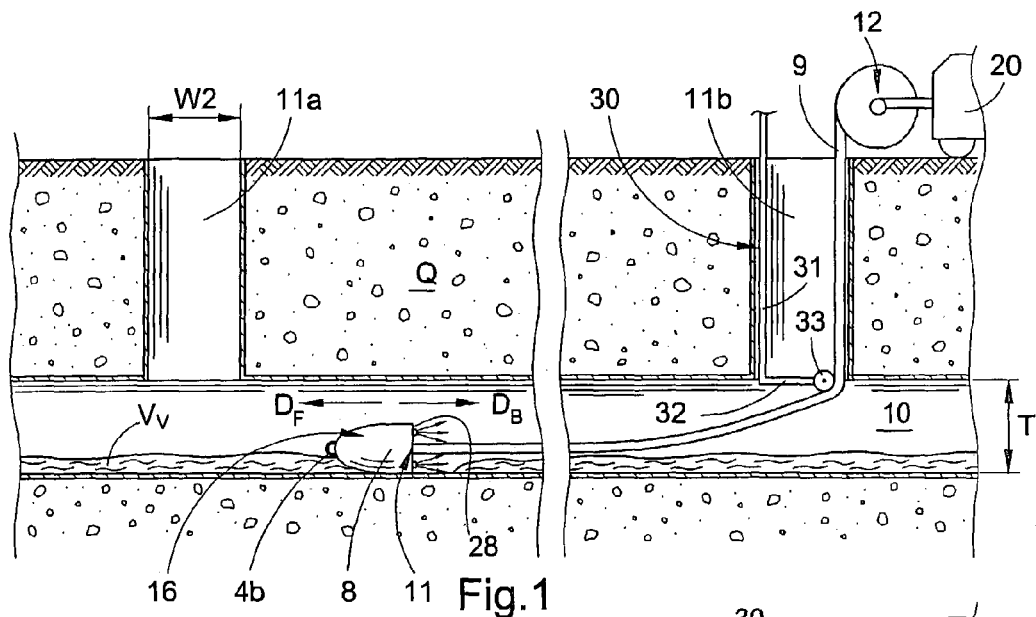
FIG. 1 illustrates the cleaning step of an underground sewer pipe by using a flush unit that is according to the invention suited to be attached to a camera unit, seen in a vertical section in the direction of the sewer.

In the specification below, the arrangement and method of the invention is described in connection with sewer pipes, but it is pointed out that the description well corresponds to the operation in other corresponding pipes and tubes of various sizes where inspection or other shooting is performed, as well as in any inspection or shooting device used in said pipes and tubes.

In the drawings there are seen underground sewer pipes that are substantially transversal to gravity, which sewer pipes can be, in a way not intended, completely horizontal or in various ways sagging or convex, but which still are, in order to achieve a gravitational flow of the sewage water, i.e. waste water, somewhat inclined, generally for a few angular degrees. In some areas, such as sparsely populated areas, there are also used pressure-operated sewer pipes, which in that case can follow the ground surface forms, i.e. rise and descend along with the hills and valleys. Both of said sewer types are here included in the concept "sewer pipes substantially transversal to gravity", because in both cases the deviation from the horizontal level is fairly small, i.e. always below 45°, but typically below 30° and in most cases below 15°. The present invention is not related to the inspections of sewer pipes located for instance in buildings, which pipes are fairly small in diameter and mainly located vertically or nearly vertically and are easily accessed. What is more, the need to inspect sewer pipes located in buildings is not as great as the need to inspect sewer pipes located underground. Underground sewer pipes, the inspection of which is the task of the arrangement and method of the present invention, have an inner diameter of at least 100–150 mm, but generally 250 mm or more—thinner pipes are generally not installed underground, except for very short conduits for instance from single-family houses to branch sewers. A sewer pipe 10 located in the ground Q is accessed through sewage tanks 11a, 11b, which are connected to the sewer pipe proper and open on the ground surface. Naturally there may be several sewage tanks with distances varying from tens of meters to hundreds of meters. Sewer pipes can be buried in shallow ground, for instance at the depth of one meter, but generally they are buried remarkably deeper, such as at the depth of three—ten meters or even deeper.

Sewer pipes 10 located in the ground Q are first cleaned by using a flush unit 8 that has ample room to move along the sewer pipe. In this case the flush unit comprises at its proximal end $E_P$, i.e. nearer to the spot where said unit is brought into the sewer, i.e. at its end 11b located nearer to another sewage tank, a number of substantially backwards directed nozzles 18, and a flexible flush hose 9, the first end 12a whereof is attached to the flush unit, to the proximal end $E_P$ thereof, and the second end 12b whereof extends to outside the sewer pipe, typically through the sewage tank 11b to above ground and to the actuator units located there. As for the actuator units, they include water pressurizing means 20, such as a suitable pump and a water supply source. The other end 12b of the flush hose is connected to the water pressurizing means 20, which make the pressurized liquid $V_H$ to flow into a liquid channel inside the flexible flush hose 9, typically into a water channel 19. When the inner liquid channel of the flush hose is inside the flush unit connected to the nozzles 18, the flow of the pressurized water $V_H$ along the flush hose, through the flush unit and further to the nozzles 18 creates powerful jets 28 in the sewer pipe. Said jets 28 are directed mainly backwards, i.e. from the flush unit in the direction from which the flush hose 9 is coming, in order to be solidly and compactly attached to the flush unit. It is pointed out that the jets 28 form an angle β that in average is small in comparison with the lengthwise direction of the sewer pipe, in order to make the jets hit the sewer pipe wall 10' and at the same time still create the recoil force F that transports the flush unit towards the direction $D_F$ of the jets. Said small mutual angle β is generally not larger than +45° or not smaller than −45°, but typically not larger than +30° or not smaller than −30°. It should be observed that the separate nozzles 18 can have different orientations; some may be completely or nearly parallel with the sewer pipe, some may be set at a larger angle with respect to said pipe, some even at a larger/smaller angle than the above mentioned +45°/−45°, and some may possibly be placed crosswise. Along the flush hose, there is fed the liquid pressure P, which is at least 120 bar or preferably within the range 150 bar–250 bar liquid, usually the rate of flushing water $V_H$ being 300 l/h–400 l/h. In connection with said flushing, the recoil force F of the thus operating jets 28 is allowed to move the flush unit 8 in the direction $D_F$, and in the second step of the flushing operation, the flush nozzle is moved by pulling at the 9 in the opposite direction, i.e. backwards in the direction $D_B$, and simultaneously the jets are allowed to stay in operation. When necessary, said back and forth movements can be repeated several times. In this text, the direction "forwards" refers to the direction in which the recoil force of the jets 28 tends to move the flush unit, and the direction "backwards" refers to the opposite direction. The appearance of the flush unit 8 can be chosen fairly freely, but it is advantageous to design the front end 46, opposite to the proximal end, as rounded in a convex fashion, for instance as a spherical calotte, a rotational parabola or a combination of various forms etc., and it is advantageous to design the form of the rest of the flush unit casing as rounded in cross-section, for example as an ellipse or preferably a circle. Thus the flush unit 8 may in appearance resemble for instance a bullet or a cartridge, because for the above described flushing step, the rotation of the flush unit around its central line that is parallel to the sewer pipe is not significant.

In order to inspect the inner surface of the sewer pipe 10, there is used a camera unit 1 that can be installed in the flush unit and comprises optical image forming means 5 and an image detector or detectors S as well as illumination elements 2 and a power source P. The optical image forming means 5 are pointed substantially in the opposite direction with respect to the above described nozzles 18, or they are at least arranged at the end located further away from the nozzles 18. According to the invention, the optical image forming means 5 of the camera unit 1 constitute either a so-called fish-eye lens 15a, the optical axis OA1 of which is attempted to be kept at least roughly parallel with the motional direction of the arrangement and/or with the pipe 10 to be shot, or alternatively some other lens 15b, the optical axis OA1 whereof is likewise attempted to be kept at least roughly parallel with the motional direction of the arrangement and/or with the pipe 10 to be shot, and in front of said lens, a rotation symmetrical curved mirror 15c, or alternatively at least a number of radially outwards pointed lens s 15d, in which case the optical axes OA2 of said several lens s are preferably located on the same level H, which is attempted to be kept perpendicular to the motional direction of the arrangement perpendicular to the motional direction of the arrangement and/or to the pipe 10 to be shot. The lens s 15a, 15, 15d form on the image detector or detectors S an image of a circumferential zone $K_i$ of the inner surface of the sewer pipe 10.

The angular field of view of a fish-eye lens 15a is typically 180° or nearly 180°, wherefore fish-eye lenses represent a special case of wide-angle lenses. In the group of fish-eye lenses 15, depicted schematically in FIG. 4, can also be classified lens s with an angular field of view of over 100° or at least 120°, generally at least 150°, and also lens s with an angular field of view of over 180°. From the point of view of the invention, it is advantageous that the angular field of view should be $\geqq 180°$. It is pointed out that the structure must be such that said angular field of view can be applied on all planes passing through the optical axis of the lens, and that the image is formed simultaneously at all spots of the image detector S. All panoramic shooting systems, where the optical axis of the lens is moved with respect to the image detector, or where the whole camera is rotated, physically or mechanically, are excluded, which means that the camera arrangement applied in the invention has a fixed structure.

When the image forming means are said other lens 15b and said curved mirror 15c, the other lens 15b can be for instance a wide-angle lens, such as a fairly restricted wide-angle lens, or a lens with a so-called normal focal distance. An angular field of view that satisfies the definition above can be for example within the range 35°–70°, as is seen from FIG. 5. In front of said other lens, i.e. on the opposite side with respect to the image detector S, there is provided a mirror 15c, curved in a given way, the reflecting surface 22 of which points to the lens 15b. The central area $23_C$ located on the optical axis OA1 of the curved mirror 15c, with respect to which optical axis the mirror is rotation symmetrical, is nearer to the lens than the border areas $23_B$ that are located at the radius R from the optical axis, which means that in this sense the curved mirror is convex and reflects in directions that are transversal to the length of the sewer pipe, more precisely in the direction of the radii of the optical axis—when observed as projected onto a plane that is perpendicular to the optical axis—towards said optical axis OA1 and there towards the lens 15b, as is understood from FIGS. 8A–8C. The sideline of the curved mirror 15c, i.e. the surface form on the planes passing through the optical axis OA1, can be convex, as in FIG. 8A, or straight, as in FIG. 8B, or concave, as in FIG. 8C. Thus the surface of the curved mirror may have the form of a spherical calotte or a truncated spherical calotte or a rotational paraboloid or a rotational hyperboloid or a rotational ellipse etc., in a way apparent from FIG. 8A, or it may have the form of a truncated toroid etc., in a way apparent from FIG. 8C. In particular, in said latter cases, where the optical image forming means 5 include a curved mirror and a lens, but when desired also in the case of the fish-eye lens, the camera unit 1 also includes a cylindrical and water-tight protective tube 25, which is made of a transparent material and surrounds said mirror and lens therebetween, or respectively a fish-eye lens. Because the camera unit 1 and the method according to the invention do not at all use the middle area $A_c$ of the image, but only the circumferential zone of the image area, to be described in more detail below, the end 26 of the protective tube 25 can be opaque, and possibly it may even be preferable that it is opaque. In shape the protective tube is either a straight circular cylinder or a circular cone, in a case where the image forming beams R are not exactly perpendicular to the optical axis OA1, but it is still desired that the image forming beans penetrate the protective tube at right angles. Advantageously the material of the protective tube is a suitable type of glass.

When the image forming means constitute said number of radially outwardly pointed lenses 15d, each of said lenses has its own image detector S, and the number of said detectors is such, and their angular fields of view are chose so that for this number of image detectors, there is pictured at least 100% of the circular dimension Y of the wall 10' of the pipes 10 with various diameters. It must be understood that when the lenses 15d are located at given circular distances on the circumference of a circle with a given radius, and each of said lenses has a fixed angular field of view, they must be arranged in proportion, so that the whole circumference of even the smallest pipe to be shot is expanded at least once for one of the image detectors S. When the same device is used for shooting a larger pipe, in the central areas of the optical axes OA2 of the lenses, part of the inner surface of the pipe 10 is pictured in two adjacent image detectors S, i.e. part of the inner pipe surface is pictured twice, and the more so the larger the pipe that is being shot. This does not, however, cause any disturbance, because in the present invention, from the number of images obtained at each moment from the image detectors, there is formed one scanning image of the section $K_i$, in which case possible overlapping elements of the sub-images are eliminated. In fact, a slight overlapping may even be advantageous, because in that case the mutual aligning of the sub-image edges may be checked or secured. In this case the number of the lenses 15*d* is at least three, generally at least four, five or six, but it can be even remarkably larger. Consequently their optical axes OA2 are radial and preferably located on one plane H, even if they in principle could be located on several mutually parallel planes, which on the other hand results in a more complicated structure. In any case, said optical axes OA2 located on each level are intersected at Z and create, even if they were located on different levels, a common intersection Z in a projection that is perpendicular to said planes, which intersection Z can also be called a virtual intersection. In this camera unit 1 and method according to the invention, it is possible—unlike in the other embodiments—also to use the central areas $A_C$ of the sub-images, although only linear parts of the sub-image areas, to be explained in more detail below.

According to the first embodiment, the image detector S arranged inside the camera unit, in which the fish-eye lens 15*a* or other lens 15*b* as well as the rotation symmetrical curved mirror 15*c* forms image of the wall 10' of the sewer pipe, is an area cell $S_S$ composed of evenly distributed pixels 19*a*, 19*b*, as is schematically illustrated in FIG. 9A. Said image detector S can be a CCD cell or a CMOS cell or other similar cell with a known or new structure, and it is not explained in more detector owing to its familiarity. According to the invention and from the point of view of the invention, the most essential part in the area cell $S_S$ orders the border area, more precisely those pixels 19*a* in the border area in which are pictured those image forming beams R that are reflected from that wall 10' of the sewer pipe that is substantially perpendicular to the optical axis OA1, and thus mainly perpendicular to the average wall surface of the sewer pipe. That area in the sewer pipe wall 10' from which the image forming beams R are thus emitted, at right angles towards the optical axis OA1, is the circumferential zone $K_i$ of the sewer pipe, as is understood from FIGS. 3, 4 and 5. Said zone $K_i$ is pictured as a circle in the area cell $S_S$. In an area cell of this type, the pixels 19*a*, 19*b* are located at regular intervals in the rectangular coordinates thereof, and therefore there is no group of pixels that should exactly correspond to the circle to be pictured, but there must be chosen the pixels 19*a* located nearest to the circle to be pictured, said pixels forming an annular group of the pixels 19*a*. This approximation does not, however, in any way deteriorate the result. As an alternative, the image detector S, in which the fish-eye lens 15*a* or other lens 15*b* and the rotation symmetrical curved mirror 15*c* placed in front of it forms image of the wall 10' of the sewer pipe, is according to another embodiment a line cell $S_L$, formed of pixels 19*a* arranged substantially in the form of a circle, as is schematically illustrated in FIG. 9B. Also this image detector S can be a CCD cell or a CMOS cell or other similar cell representing a know or new structure. In the line cell $S_L$, where the line is a circle and which is formed of an annular group of pixels 19*a*, the pixels 19*a* can be fairly precisely arranged on the circle in which the above described section $K_i$ is pictured. In this case none of the pixels included in the image detector is unnecessary. It is naturally possible to use in the image detector more than one of the above described pixels in the radial direction with respect to the optical axis OA1, as long as the pixel group forms the right circle, but at present it is not assumed that several pixels in this direction should result in any advantages. On the other hand, an increase in the number of pixels in the direction of the annular image circumference corresponding to the section $K_j$ improves the accuracy and resolution of the final image. The direction of the image forming beams R passing from said circumferential zone $K_i$ to the fish-eye lens 15*a*, or respectively via the rotation symmetrical curved mirror 15*c* to another lens 15*b*, deviates from the normal Node of the optical axis OA1 of the image forming means 5 at an angle α, which is not larger than 45°, or advantageously not larger than 30°, or typically not larger than 10°. It is particularly emphasized that in the image, there is recorded or formed into an image only the border zone located far from the optical axis OA1, which in a sewer pipe means a narrow circumferential zone $K_i$, the width whereof in the lengthwise direction of the sewer pipe is for instance in the region of one pixel, naturally with due attention to the scale of reproduction, and on the surface of a light-sensitive cell, i.e. on the image area of the circle. The data relating to the central region of the image area is ignored. This means that when moving the camera unit, the wall of the sewer pipe is shot by scanning, and a central perspective image is not made of the pipe.

As a first alternative, the image detector S placed inside the camera unit, in which detector the fish-eye lens 15*a* or other lens 15*b* and the rotation symmetrical curved mirror 15*c* provided in front of it forms image of the wall 10' of the sewer pipe, is according to the first embodiment an area cell $S_S$ composed of evenly distributed pixels 19*a*, 19*b*, as is schematically illustrated in FIG. 9A. Said image detector S can be a CCD cell or a CMOS cell or other similar cell representing a known or a new structure, and it is not explained in more detail owing to its familiarity. In the area cell $S_S$, i.e. in the cell having an area formed by length and width, is according to the invention and from the point of view thereof, the most important feature is the border area, more precisely those pixels 19*a* of the border area in which are pictured those image forming beams R that are emitted from the sewer pipe wall 10' in a direction that is substantially perpendicular to the optical axis OA1, and thus mainly perpendicular to the average wall surface of the sewer pipe. That area of the sewer pipe wall 10', from which the image forming beams R are in this way emitted at right angles to the optical axis OA1 is the circumferential zone $K_i$ of the sewer pipe, as can be understood from FIGS. 3, 4 and 5. Said zone $K_i$ is pictured in the area cell $S_S$ as a circle. In this kind of area cell the pixels 19*a*, 19*b* are in its rectangular coordinates located at regular intervals, there is no group of pixels that exactly corresponds to the pictured circle, but there must be chosen those pixels 19*a* that are located nearest to the circle to be pictured, said pixels forming an annular group of the pixels 19*a*. This approximation does not, however, in any way deteriorate the result. Alternatively the image detector S, in which the fish-eye lens 15*a* or other lens 15*b*, and the rotation symmetrical curved mirror 15*c* placed in front of it, forms an image of the wall 10' of the sewer pipe, is according to another embodiment a line cell $S_L$, formed of pixels 19*a* arranged substantially in the form of a circle, as is schematically illustrated in FIG. 9B. Likewise this image detector S can be a CCD cell or a CMOS cell or other corresponding cell representing a known or a new structure. In the line cell $S_L$, where the line is a circle and which is formed of an annular group of pixels 19*a*, the pixels 19*a* can be arranged fairly accurately in the circle in which said above described zone $K_i$ is pictured. In this case none of the pixels included in the image detector is unnecessary. It is naturally possible to use in the image detector, with respect to the optical axis OA1, in the radial direction, more pixels than the above described one pixel, as long as the pixel group forms a right circle, but at the moment it is not assumed that the use of more pixels in this direction should bring new advantageous. On the other hand, an increase in the number of pixels in the direction of the circumference of the annular image corresponding to the zone $K_i$ improves the accuracy and resolution of the final image. The direction of the image forming beams R passing from said circumferential zone $K_i$ through a fish-eye lens 15a, or respectively through a rotation symmetrical curved mirror 15c to another lens 15b deviates from the normal N of the optical axis OA1 of the image forming means 5 at an angle α, which is not larger than 45°, or preferably not larger than 30°, or typically not larger than 10°. It is particularly emphasized that from the image there is recorded, or into an image there is formed only the border zone located far away from the optical axis OA1, which in a sewer pipe means a narrow circumferential zone $K_i$, the width of which in the direction of the length of the sewer pipe is for instance in the region of one pixel, naturally with due attention to the scale of reproduction, and on the surface of a light-sensitive cell, i.e. on the image area, of the circle. The data relating to the central region of the image area is ignored. This means that when moving the camera unit 1, the wall of the sewer pipe is shot by scanning, and a central perspective image is not made of the pipe.

Figure 10:
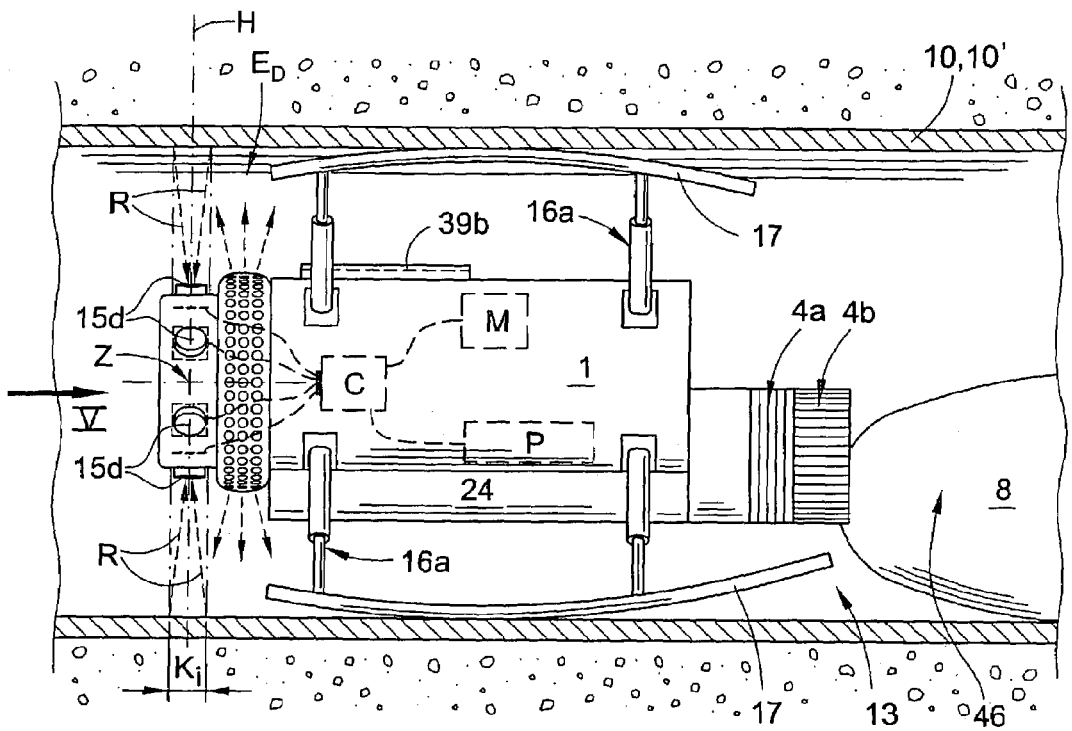
FIGS. 10 and 11 illustrate a third embodiment of the camera unit according to the invention, placed inside the pipe, as seen from the side as in FIGS. 4 and 5, from the direction IV of FIG. 11, and respectively as seen from the end from the direction View of FIG. 10.

As another alternative, the image detectors S located inside the camera unit, in each of which detectors one of the radially arranged lenses 15d forms image of the sewer pipe wall, is typically an area cell $S_S$ formed of evenly distributed pixels 19a, 19b, as is schematically illustrated in FIG. 9A. Said image detector S can be a CCD cell or a CMOS cell or other corresponding cell representing a known or a new structure, and it is not described in more detail owing to its familiarity. In this case the most essential feature in the area cell $S_S$ is, according to the invention and from the point of it, the narrow zone extending through it, more precisely those lined pixels 19a in which are pictured those image forming beams R that are emitted from the sewer pipe wall 10' in a direction that is substantially located on the plane H formed of the optical axes OA2 of the lenses 15d, and thus mainly perpendicular to the average wall surface of the sewer pipe. That area of the sewer pipe wall 10' from which the image forming beams R are thus emitted, on the plane H of the optical axes OA2, towards their intersection or virtual intersection, is the circumferential zone $K_i$ of the sewer pipe, as is apparent from FIG. 10. Said zone $K_i$ is pictured in each area cell $S_S$ as a line, and in a combination of area cells as a polygon line located on the plane H or on another plane parallel to it, and the geometric picturing errors caused thereby can be mathematically eliminated. In correspondence to what was explained above, the direction of the image forming beams R passing from said circumferential zone $K_i$ to several radially arranged lenses 15d deviates from the plane H formed by the optical axis OA3 of the image forming means 5 at an angle α, which is not more than 45°, or not more than 30°, or not more than 10°. It is particularly emphasized, that of the image there is recorded or into an image there is formed only a transversal zone located far from the intersection Z, which in the sewer pipe means a narrow circumferential zone $K_i$, the width of which in the lengthwise direction of the sewer pipe is for instance in the region of one pixel, naturally with due attention to the scale of reproduction, and an area extending transversally on the surface of the light-sensitive cell, i.e. on the image area. The data relating to the two opposite borders of the image area is ignored. This means that when moving the camera unit 1, the wall of the sewer pipe is shot by scanning, and a central perspective image is not made of the pipe.

Figure 11:
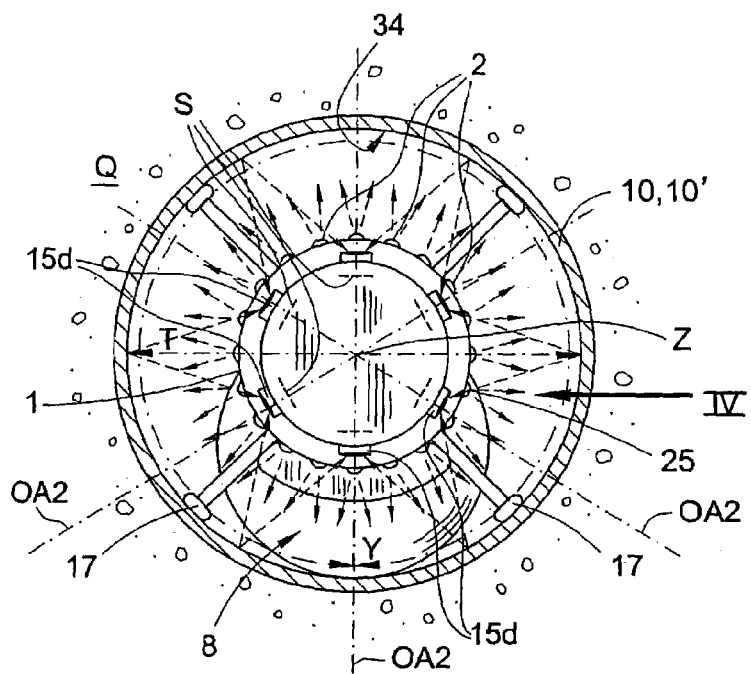

It is well known that the above described image detectors convert the entering light or other electromagnetic radiation with another wavelength, i.e. the image, into electric signals. In addition, the camera unit comprises, according to the invention, a memory M and an electronic unit C for taking electric image signals, in the case of FIGS. 4–6 from a group, with an annular shape, of pixels 19a of the image detector S; $S_S$, $S_L$, or in the case of FIGS. 10–11 from a group, with a linear shape, of pixels 19a of the image detector S; $S_S$ said group of pixels corresponding to the image of the zone $K_i$ of the inner surface of the sewer pipe, and for recording into said memory. Said memory M is advantageously semiconductor memory, such as RAM memory or FLASH memory or the like, which does not include moving parts and is thus operable even in difficult conditions. Said illuminating elements 2 are located on the circumference of the end surrounding the lens, and are substantially pointed radially outwardly, so that they effectively illuminate the zone $K_i$. The illuminating elements can be for instance powerful LEDs, light emitting diodes.

Figure 2:
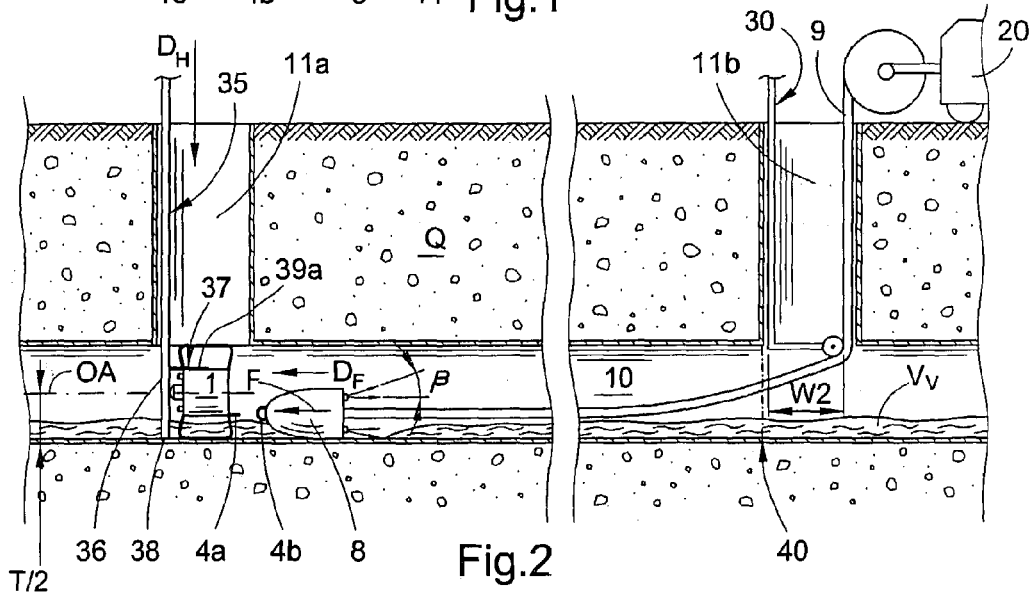
FIG. 2 illustrates a step where the flush unit and the camera unit are being connected, in the same view as in FIG. 1.
Figure 4:
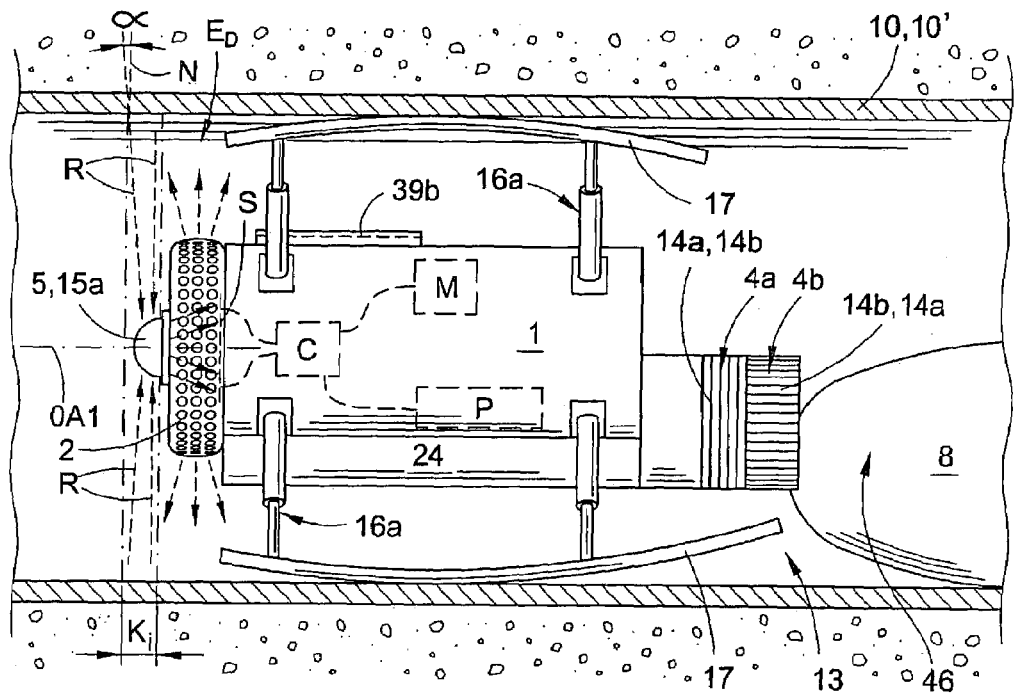
FIG. 4 illustrates a first embodiment of the camera unit according to the invention, and its magnetic connection to the flush unit, seen from the side, in the same view as in FIG. 3, but in a larger scale.

According to the invention, the arrangement also comprises automatic locking means 4a, 4b for detachably fastening the camera unit 1 and the flush unit 8 together, at least partly in succession to form a scanner combination 13, so that the optical image forming means 5 are placed at the distal end $E_D$ of said combination. Said automatic locking means 4a, 4b can be a magnetic lock comprising a magnetic part 14a provided either in the flush unit 8 or in the camera unit 1 and its counterpart 14b either in the camera unit 1 or in the flush unit 8, as is shown in FIG. 4. Said automatic locking means 4a, 4b can also be a mechanical lock, comprising a fork 14c arranged in the camera unit 1 and charged in the transversal direction by gravity G or by a spring 21d, and its counterslot 14d arranged in the flush unit 8, as is shown in 5 and 7A–7C. The magnetic lock fastens the flush unit 8 to the camera unit 1, when the flush unit moves in the way illustrated in FIG. 2 by the recoil force F forwards $D_F$ in the sewer pipe 10 towards the camera unit lowered in the sewer pipe and gets into contact therewith, at which point the flush unit and the camera unit are interlocked, so that they move together both forwards $D_F$ and backwards $D_B$ in the sewer pipe. The mechanical lock fastens the flush unit 8 to the camera unit 1 when the flush unit moves in the way illustrated in FIG. 2 by the recoil force F forwards $D_F$ in the sewer pipe 10 towards the camera unit lowered in the sewer pipe, the top extension 21a of the flush unit raises the fork 14c, which is made possible either by a telescoping structure of the fork arms 21b or for example an articulation 21c, whereafter the fork falls in its counterslot 14d, and now the flush unit and the camera unit are interlocked, so that they move together both forwards $D_F$ and backwards $D_B$ in the sewer pipe. Also many other types of automatic locking means 4a, 4b can be designed and manufactured.

Figure 3:
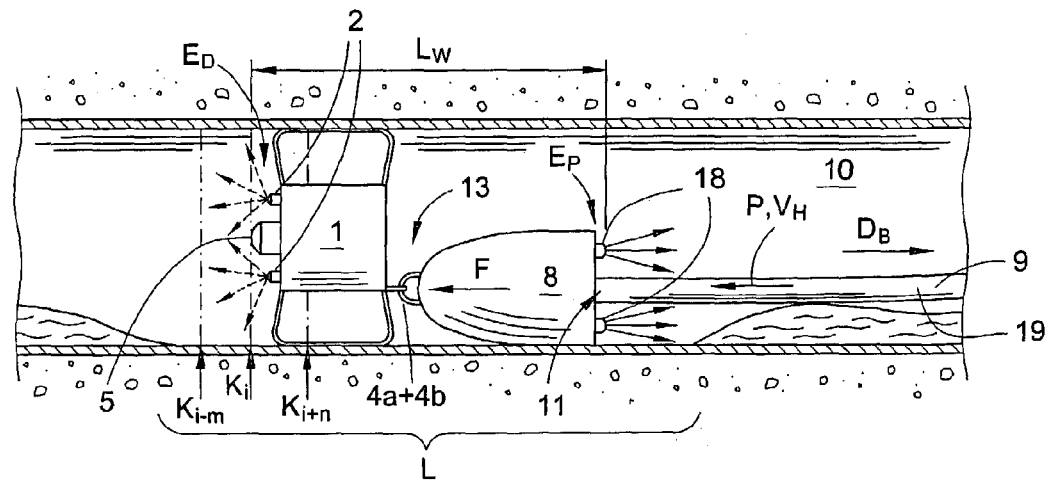
FIG. 3 illustrates the interconnected flush unit and camera unit, when observing the inside of the sewer pipe according to the invention, so that the combined flush and camera unit is moved against the direction of the water jets, otherwise seen in the same view as in FIGS. 1 and 2, but in a larger scale.
Figure 12:
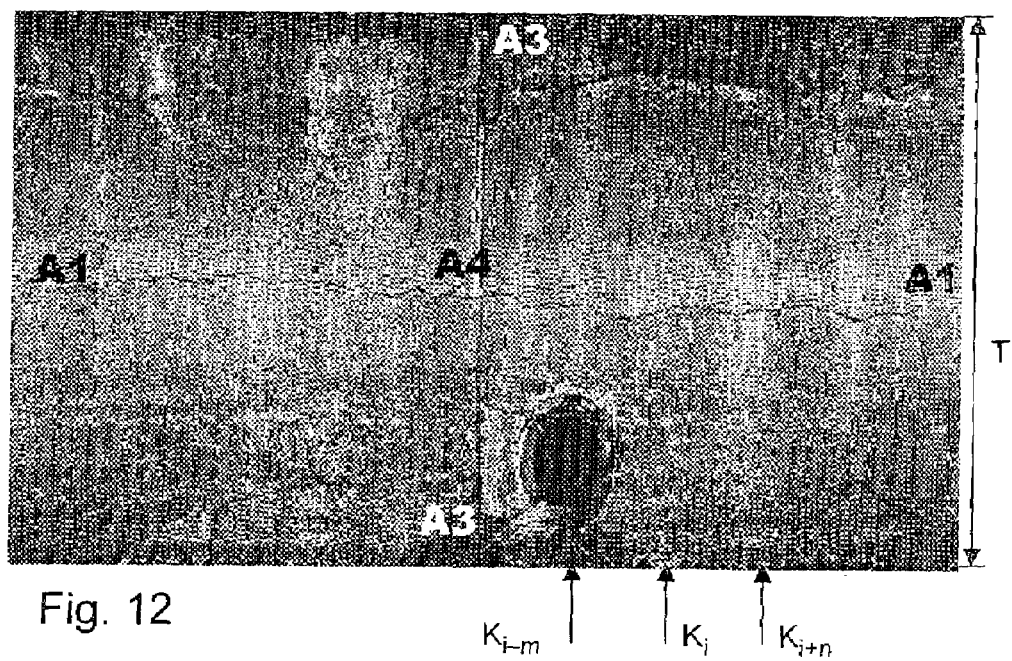
FIG. 12 represents the inner surface of a sewer pipe shot by scanning according to the invention, showing an image expanded onto a plane along the whole dimension of the circumference of the sewer pipe at a certain length of said sewer pipe.
Figure 13:
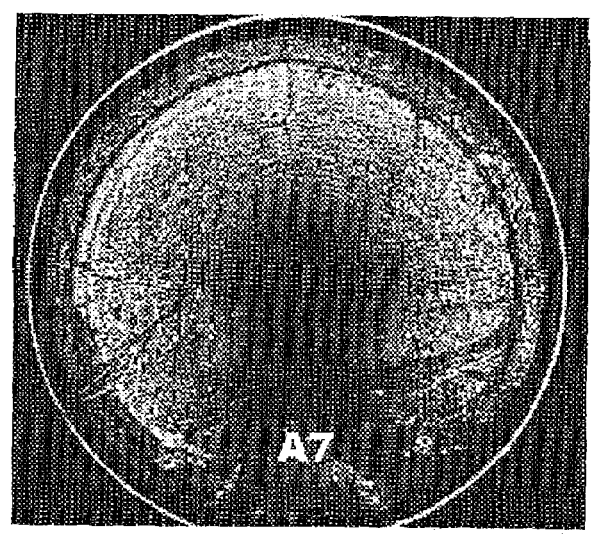
FIG. 13 represents an image obtained by means of the prior art technology from inside the sewer pipe, in this case of the same part of the sewer pipe as in FIG. 12.

According to the invention, in the scanner combination 13, thus constituting the camera unit and the flush unit as mutually interlocked, the optical image forming means 5 and the nozzles 18 have a given interval $L_W$, which is substantially as long as the distance between the zone $K_i$ and the nozzles 18 that was dealt with above. When the sewer pipe wall 10' is being shot, the scanner combination 13 is drawn backwards in the direction $D_B$, and simultaneously through the nozzles 18 there is sprayed pressurized liquid, normally and preferably flushing water $V_H$, and further simultaneously from the sewer pipe wall there is, during said backwards motion, an image of the narrow zone $K_i$, said zone moving along the wall, in the image detector S; $S_S$, $S_L$, so that the wall 10' is shot by scanning. In the scanning process, the successive circumferential wall zones $K_{i-m}$ ... $K_{i-2}$, $K_{i-1}$, $K_i$, $K_{i+1}$, $K_{i+2}$ ... $K_{i+n}$ etc, part of which is shown in FIGS. 3 and 12, are pictured in the image detector, and an image according to FIG. 12 is formed thereof, in which image said zones are shown as adjacent and parallel linear image elements, which, when connected to each other, together form the whole image. When the water $V_H$ sprayed through the nozzles has a suitable pressure Pipe, and the scanner combination 13 has a suitable pulling speed v, the jet flow proceeding from the nozzles against the motional direction $D_B$ creates a wave trough in the sewage $V_V$ located on the bottom of the sewer pipe or in any sewage located in the sewer pipe, said wave trough having such a wave trough length L that at least the pictured zone $K_i$ is located therein, as is shown in FIG. 3. In this way the whole inner circumference of the sewer pipe 10 is cleared of disturbing factors. During this scanning shooting, the liquid pressure P is at least 80 bar, or preferably within the range 100 bar–180 bar, or typically within the range 120 bar–150 bar. In small sewer pipes with a dime of $\leq$200 mm, there can often be applied the values prevailing at the bottom edge of the pressure area, for instance 90 bar–150 bar, and in big sewer pipes with a dime of >200 mm, there can be applied the values prevailing at the top edge of the pressure area, for example within the range 110 bar–180 bar; and the pulling speed v of the scanner combination 13 is within the range 8 m/min–18 m/min, or most advantageously within the range 10 m/min–14 m/min, when the above mentioned distance $L_W$ is of the order 60 cm–80 cm. It is also possible to apply pressures that are higher than those mentioned above, for example up to 250 bar or even higher. When desired, the pressure P can also be adjusted according to the quantity of sewage $V_V$ contained in the sewer pipe. It is pointed out that these values may deviate, and often do deviate, from the pressure and speed values applied during the flush cleaning of the sewer. The quantity of liquid, i.e. water, to be sprayed is typically within the range 200 l/h–400 l/h with the higher pressures mentioned above, and typically within the range 100 l/h–300 l/h with the lower pressures those mentioned above. The water pressure P and the pulling speed v of the scanner combination 13 can be predetermined standard values, or they can be standard values depending on the sewer pipe diameter and of each other, which values can be determined for instance experimentally in advance. It is also possible to make the water pressures P to be automatically adjusted for example by means of the data obtained from the image detector S, in which special case it is possible to make use of the pixels 19b located adjacent to the groups 19a of linear pixels, for instance in the area cell $S_S$. For this adjustment, the scanner combination comprises adjusting means for adjusting the liquid pressure P that creates the jets through said nozzles, case by case to correspond in the scanner combination the distance $L_W$ and the pulling speed v, so that said jets create in the liquid possibly contained in the sewer pipe a wave trough length L at least at said zone $K_i$. In any case the distance $L_W$ between the image forming means 5 and the nozzles 18, the liquid pressure P and the pulling speed v of the scanner combination are in advance or in a predetermined way matched with each other, so that said jets create in the liquid possibly contained in the sewer pipe a wave trough length L at least at said zone $K_i$.

Figure 5:
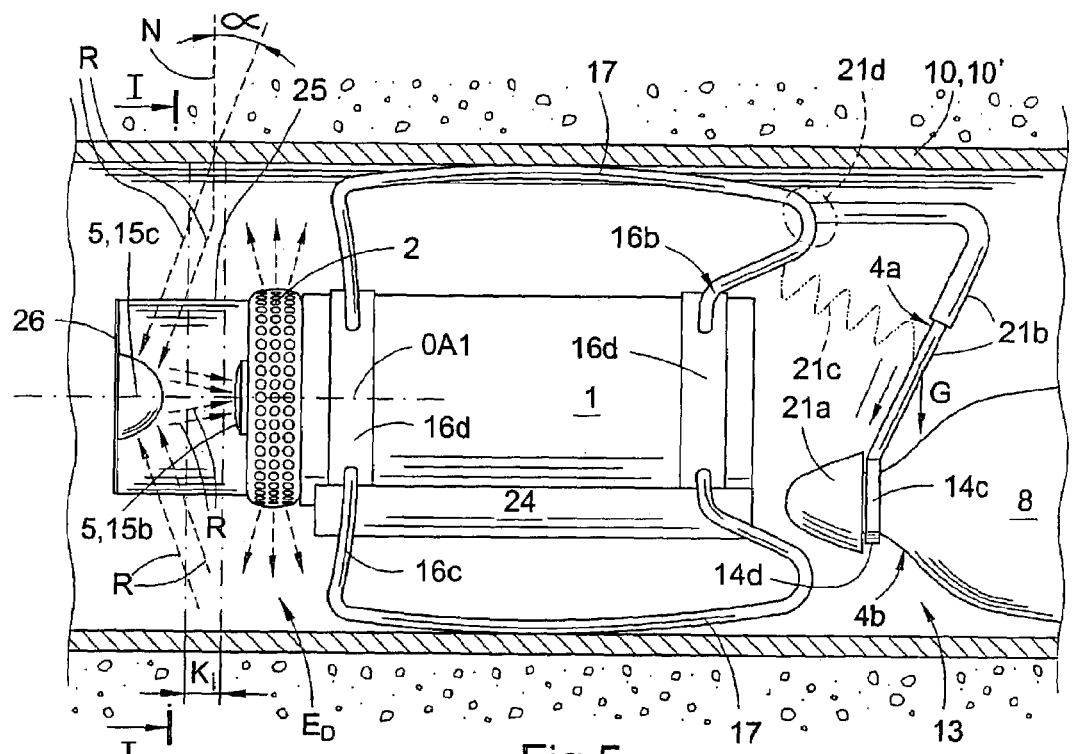

In order to align the intersection Z of the optical axis OA1 of the optical image forming means 5 of the camera unit 1 or of the optical axes OA2 in the sewer pipe, the arrangement also comprises in the camera unit 1 either adjustable legs 16a, as in FIG. 4, or replaceable legs 16b, as in FIG. 5, provided with slide rails 17. The camera unit includes legs 16a, 16b irrespective of the type at least three or advantageously four or possibly even more sets, so that they are arranged radially to outwards the optical axis, as is shown in FIG. 6. The adjustable legs 16a are for instance telescoping legs that can be adjusted to be nearer to the optical axis for sewer pipes with a smaller diameter T, or to be further from the optical axis for sewer pipes with a larger diameter. Replaceable legs 16b are achieved for example by means of combination of fixed leg elements 16c and sleeves 16d that exactly fit in the camera unit housing, so that the combination can be removed by pulling in the direction of the optical axis, and replaced by another combination with leg elements of a different length, by pushing it in the direction of the optical axis on top of the camera unit, as can be understood from FIG. 5. Naturally the replaceable legs can also be arranged in grooves or other fastening points provided in the housing. In this fashion the slide rails 17 provided at the outer ends of the legs 16a, 16b are arranged on the circumference of a circle that with a suitably small clearance corresponds to the inner diameter T of the sewer pipe. Now the slide rails control, by getting guidance from the sewer pipe wall 10', one optical axis OA1 of the camera unit 1, or the intersection Z of the optical axes, to be set in the middle of the sewer pipe, thus enabling an accurate image with a standard scale along the whole circumference of the sewer pipe. In addition, the camera unit 1 comprises a ballast 24 placed in the bottom parts of the camera unit, as is shown in FIGS. 4–6. Said ballast keeps the camera unit 1 in the same position with the circumferential direction during the scanning operation, i.e. it prevents the camera unit from rotating around the optical axis OA1 or respectively around the intersection Z of the optical axes. As a result it is achieved that in the final image expanded as a belt, shown by way of example in FIG. 10, the top area of the sewer pipe remains all the time at the same spot, for instance at the center line of the image, and the bottom area of the sewer pipe remains all the time at the same spot, for instance at the top edge=bottom edge of the image.

Moreover, the arrangement comprises, as preferred embodiments, also the following auxiliary elements. For fastening the camera unit 1 and the flush unit 8 together, the arrangement includes assembling means 35 of the camera unit, said assembling means being arranged to be inserted from above to the sewage tank 11a, which sewage tank is some other sewage tank—generally the next one—than then sewage tank from which the hose 9 proceeds to the flush unit; said assembling unit 35 includes a vertical control element 36 that is at the bottom end supported against the sewer pipe bottom; and at the bottom parts a bracket 37 for the camera unit. In its simplest form, the vertical control element 36 is a bar that extends from the ground level to the sewer pipe. At the distal end, the camera unit can be attached by some suitable means to said bar-like vertical control element, at a distance that is as long as half of the sewer pipe diameter, i.e. the optical axis OA1, or at the intersection Z, at the distance T/2 from the bottom end 38 of the vertical control element 36. When the vertical control element 36 together with the camera unit is lowered in the sewage tank in the direction $D_H$, the camera unit is set at the right spot on the transversal surface of the sewer pipe, so that the flush unit 8 moving into contact with the camera unit is securely locked in the camera unit in the way described above. The bracket 37 must represent a type that is capable of supporting the camera unit, but is detached thereof when the camera unit is again pulled backwards in the direction $D_B$. In the simplest form, the bracket 37 is a branch 39a rigidly attached to the vertical control element and protruding therefrom in a perpendicular direction, which branch fits in the hole or trough 39b arranged in the top part of the camera unit, in parallel with the optical axis, as can be understood from FIGS. 3 and 4. When the branch 39a is placed in the hole 39b, the vertical control element supports the camera unit in the right position, i.e. so that the optical axis is substantially vertical, and when the camera unit is pulled away from the vertical control element 36 in the direction $D_B$, the hole 39b, or more precisely of course its frame part, slides away from the branch 39a. Many other solutions are likewise possible, too. Moreover, the arrangement includes a hose control element 30 to be inserted from the top into the sewage tank 11b, i.e. exactly to the same sewage tank from which the hose passes to the flush unit, said hose control element comprising a vertical support 31, a transversal branch 32 provided at the bottom end of the vertical support, the dimension W1 whereof approaches the diameter W2 of the sewage tank, and a guide roller 33 provided at the outer end of the transversal branch. When the vertical support 31 is placed at that edge of the sewage tank through which the sewer pipe 10 to be flushed and inspected proceeds from the sewage tank forwards, and the guide roller 33 is placed at the opposite edge of the sewage tank, at the height of the highest point 34 of the sewer pipe or further down, and further the flushing hose is made to wind along the guide roller on the side that points away from the vertical support, first of all the damaging of the flushing hose is prevented, and secondly at the end of said scanning operation, the scanner combination can be pulled at the sewage tank so far that the camera unit 1 is capable of shooting the area 40 of the junction between the sewer pipe 10 and said sewage tank 11b.

The arrangement described above is operated and used as follows. First the sewer pipe is generally flushed clean, and during said flushing step the flush unit 8 moves alternatingly forwards, in the direction $D_F$, owing to the recoil force F caused by the pressurized flush water $V_H$ gushing through the nozzles 18, and alternatingly backwards in the direction $D_B$ by pulling at the flush hose 9. During the back and forth movements, the pressurized flush water $V_H$ gushing through the nozzles 18 cleans the sewer pipe wall 10'. The flush unit 8 is moved in this way in the chosen section of the sewer pipe, at the other end of which section there is also located the sewage tank 11a, for a required number of times. For flushing said sewer pipe clean, the motional speed of the flush unit is typically of the order 5 m/min–8 m/min.

In the method according to the invention, there are inspected the sewer pipe or sewer pipes connected to sewage tanks by first applying the following preparatory steps and preparatory measures. The camera unit 1, including first automatic locking means 4a, is lowered through a first sewage tank 11a at the sewer pipe 10, whereafter said camera unit is held in place. Then the flush unit 8, including second automatic locking means 4b, is allowed to move by the recoil force F of the liquid jets ejected through the nozzles 18 along the sewer pipe 10 forwards, into contact with the camera unit, and to be attached and locked therein to form a scanner combination 13.

Next in the method according to the invention there are inspected the sewer pipe connected to the sewage tank or sewage tanks by applying the following shooting steps and measures. The camera unit 1, comprising at the distal end $E_D$ optical image forming means 5 provided with image detectors S, and the flush unit 8, comprising at the proximal end $E_P$ backwards pointing nozzles 18, are attached together to form a scanner combination 13. This fastening of the camera unit and the flush unit to form the scanner combination 13 is carried out inside the sewer pipe 10, and at some other sewage tank 11a than the sewage tank 11b through which the flush unit 8 was inserted into the sewer pipe. Next the pressurized P liquid is allowed to be ejected through the nozzles 18 as jets, and at the same time said scanner combination is pulled at the speed v backwards in the direction $D_B$ against the recoil force F of the jets, so that in the liquid, i.e. sewage or other water possibly contained in the sewer pipe, there is created a wave trough with a wave trough length L that moves along with the scanner combination. Simultaneously with the latter operation, the narrow circumferential zone $K_i$ on the inner surface of the sewer pipe, located at the wave trough length L, which as the target of scanning is naturally shifted along with said pulling speed and with the movements of the camera unit, is allowed to be pictured on the image detector S of the camera unit. Further, simultaneously with the latter operation, the successive data obtained from the detector, corresponding to the successive zones $K_{i-m}$ ... $K_{i-2}$, $K_{i-1}$, $K_i$, $K_{i+1}$, $K_{i+2}$ ... $K_{i+n}$ etc. is recorded as a scanning file in the memory M provided in the camera unit 1. Thus the recording in the semiconductor memory M takes place simultaneously as the circumferential zone $K_i$ is pictured in the image detector or detectors S. This step can be called the scanning step.

Finally, when the scanning step is finished and the whole section of the chosen sewer pipe is scanned, the scanner combination 13 is removed from the sewer pipe and the scanning file is unpacked from the semiconductor memory M for further processing and/or display.

As a conclusion, let us once more point out that in principle from that image area where the image detector is located there only is recorded the annular section which in a sewer pipe means the circumferential zone, generally referred to with the symbol $K_i$, and on the area, i.e. image area of a light-sensitive cell, means a circle. The image data related to central section of the image area is ignored. When the camera unit is at the same time moved along the sewer pipe, this means that the wall of the sewer pipe is shot by scanning, and a central perspective image is not made of the pipe. Thus the size of the file is made so small, at one sewage tank interval typically a few megabytes, depending on the applied file packaging method, that the data can be @@@@recorded in the RAM memory or in the FLASH memory, which means that there is not needed a vibration-sensitive hard disk or a video tape, and at the same time there is obtained a high accuracy for the image—for instance 4600 dots per millimeter in the lengthwise direction of the pipe wall. In the present invention, the camera unit 1 is from the point of view of shooting a completely independent device which is not connected anywhere in a known fashion by electric or signal cables, but it is operated for instance by batteries. This is possible, because the above described recording method of scanned data has a very low consumption of electricity. However, the greatest savings in the consumption of electricity is achieved in that the camera unit 1 is only moved by means of the flush unit 8 connected thereto for the purpose of scanning, which means that the camera unit does not need its own specific conveyor means. During the scanning process, the scanner combination 13 is pulled at a suitable speed V, which is typically higher—for instance by 20%–200% higher and often by 100% higher, i.e. doubled—in comparison with the speed during the flushing in the direction $D_B$ along the sewer pipe 10. During said pulling, the narrow zone $K_i$ that is pictured through the fish-eye lens 15a or the rotation symmetrical mirror 15c and the lens 15b of the camera unit of the scanner combination in the area cell $S_S$ or in the annular line cell $S_L$ is scanned at the same time as the uninterrupted supply of the flush water $V_H$ through the nozzles 18 during the whole duration of the pulling operation creates the special effect where the flush water gushing through the nozzles by its pressure pushes the sewage water $V_V$ contained at the pipe bottom away ahead of it, so that in the sewer pipe there is created a zone free of all liquid, which zone has a wave trough length L and moves along with the scanner combination. Because the camera unit 1 follows immediately behind the flush unit 8 and the nozzles contained therein, the image area seen by the lens 15a, 15b or lenses 15d, i.e. precisely the scanned zone $K_t$, is placed inside said sewage-free zone, in which case there is obtained excellent image data of the whole circumferential surface of the sewer pipe.

The invention claimed is:

1. An arrangement for inspecting pipes that are substantially transversal to gravity, said arrangement comprising as a combination:
   a flush unit (8) being ample to move inside a pipe (10), and at a proximal end ($E_P$) of said flush unit substantially backwards pointing nozzles (18);
   a flexible flush hose (9), a first end (12a) whereof attached to the flush unit, at the proximal end ($E_P$) thereof, and a second end (12b) extending to outside the pipe, said flush hose (9) being arranged to move the combination at a pulling speed (v) against the recoil force (F) of the jets;
   liquid pressure means (20) connected to the other end of the flush hose in order to create a flow of a pressurized (P) liquid ($V_H$) along the flush hose to the flush unit and further through said nozzles to the pipe;
   a camera unit (1) comprising optical image forming means (5) at a distal end ($E_D$) of the combination and an image detector (S) as well as illumination means (2) and a power source (P), the optical image forming means being pointed substantially in the opposite direction with respect to the nozzles;
   characterized in that in said arrangement:
   the optical image forming means (5) include: a fish-eye lens (15a), or a lens (15b) with a smaller angular field of view, and in front of the lens a rotation symmetrical curved mirror (15c), or at least a number of radially outwards pointed lenses (15d);
   in order to create an image of a circumferential zone ($K_1$) on the inner surface of the pipe; and that the arrangement further includes:
   automatic locking means (4a, 4b) for a mutual, detachable fastening of the camera unit (1) and the flush unit (8), at least partly one after another in order to form a scanner combination (13), so that the image forming means (5) and the nozzles (18) have a predetermined distance ($L_w$) that enables the creation of a wave trough length (L) by said jets in the liquid possibly contained in the pipe, at least at said zone ($K_t$).

2. An arrangement according to claim 1, characterized in that in the scanner combination (13), on one hand the distance ($L_w$) between the optical image forming means (5) and the nozzles (18) and on the other hand the liquid pressure (P) that creates the jets through said nozzles, and/or the pulling speed (v) of the scanner combination against the recoil force (F) of the jets are preadjusted to be such in respect to each other that said jets create a wave trough length (L) in the liquid possibly contained in the pipe, at least at said zone ($K_t$).

3. An arrangement according to claim 1, characterized in that the liquid pressure (P) is at least 80 bar, or within the range 100 bar–180 bar; and that the pulling speed (v) of the scanner combination is within the range 8 m/min –18 m/min, or within the range 10 m/min–14 m/min.

4. An arrangement according to claim 1, characterized in that it further comprises a hose guiding element (30) to be inserted through the top in an access sewage tank (11b), said guiding element comprising a vertical support (31), a transversal branch (32) arranged at the bottom end of the vertical support, the dimension (W1) of said transversal branch approaching the diameter (W2) of the access sewage tank, and at the outer end of the transversal branch a guide roller (33).

5. An arrangement according to claim 1, characterized in that said automatic locking means (4a, 4b) are:
   a magnetic lock comprising a magnetic element (14a) arranged either in the flush unit (8) or in the camera unit (1) and its counterpart (14b) arranged either in the camera unit (1) or in the flush unit (8); or
   a mechanical lock, comprising in the transversal direction a fork (14c) charged in the transversal direction either by gravity or a spring load in the camera unit (1) and its counterslot (14d) in the flush unit (8).

6. An arrangement according to claim 1, characterized in that it further comprises in the camera unit (1) adjustable legs (16a) or replaceable legs (16b) provided with slide rails (17) in order to arrange the intersection (Z) of the optical axis (OA1) or optical axes (OA2) of the camera centrally in the pipe.

7. An arrangement according to claim 1, characterized in that it further comprises assembling means (35) for the camera unit (1) to be inserted through the top in an access sewage tank (11a), said assembling means comprising a vertical guidance element (36) which at the bottom end is supported against the pipe bottom and is at the bottom parts provided with a bracket (37) for the camera unit.

8. An arrangement according to claim 1, characterized in that the image detector (S) is either an area cell ($S_S$) composed of evenly distributed pixels (19a, 19b), said area cell having a border area, or a line cell ($S_L$) composed of pixels (19a) substantially arranged in the form of a circle; and that the direction of the image forming beams (R) proceeding from said circumferential zone ($K_i$) through the fish eye lens (15a), or respectively through a rotation symmetrical curved mirror (15c) to another lens (15b) deviates from the normal (N) of the optical axis (OA1) of the image forming means (5) at an angle (α), which is not larger than 45°, or not larger than 30°, or not larger than 10°.

9. An arrangement according to claim 1, characterized in that the image detector (S) comprises several area cells ($S_S$) composed of evenly distributed pixels (19a, 19b) having transversally extending areas; and that the direction of the image forming beams (R) proceeding from said circumferential zone ($K_i$) to several radially arranged lenses (15d) deviates from the plane (H) formed by the optical axis (OA2) of the image forming means (5) at an angle (α), which is not larger than 45°, or not larger than 30°, or not larger than 10°.

10. An arrangement according to claim 8, characterized in that it also includes in the camera unit a memory (M) and an electronic unit (C) for extracting electric image signals from an annular-shaped group of pixels (19a) from the image detector (S; $S_S$, $S_L$), said group of pixels corresponding to an image of the zone ($K_1$), located on the inner surface of the pipe, and for storing said signals into said memory.

11. An arrangement according to claim 10, characterized in that said memory (M) is semiconductor memory.

12. An arrangement according to claim 1, characterized in that when the image forming means constitute a combination of said lens (15b) with a smaller angle and said curved mirror (15c), it also comprises a cylindrical and water-tight protective tube (25) that surrounds said mirror and lens and is arranged in between them.

13. An arrangement according to claim 1, characterized in that said illumination means (2) are located on the circumference of the end surrounding the lens and are substantially pointed radially outwards.

14. An arrangement according to claim 1, characterized in that it further comprises in the camera unit (1) a ballast (24) arranged at the bottom part of said unit, in order to keep the camera unit in a constant position.

15. An arrangement according to claim 1, characterized in that the camera unit (1) has a fixed structure.

16. A method for inspecting pipes connected to access sewage tanks, said method comprising as steps:
- arranging as a combination a camera unit (1) including at its distal end ($E_D$) optical image forming means (5) provided with image detectors (S), and a flush unit (8), including at its proximal end ($E_P$) backwardly pointing nozzles (18);
- placing said combination inside a pipe that is substantially transversal to gravity;
- allowing a pressurized liquid to be ejected through said nozzles as jets, at the same time as pulling said scanner combination backwards against the recoil force (F) of said jets, and simultaneously the camera unit takes images about the inside of the pipe, characterized in that the method further comprises the steps:
- adapting the camera unit to create images of circumferential zones ($K_i$) of the inner surface of the pipe, so that the camera unit (1) and the flush unit (8) together form a scanner combination (13);
- pulling the scanner combination at such a predetermined speed (v) backwardly against the recoil force (F) of the jets that in the liquid possibly contained in the pipe, there is created a wave trough length (L);
- allowing the circumferential zone ($K_i$) of the inner pipe surface, located at the wave trough length (L), to be transformed as an image in the image detector (S); and
- recording successive data corresponding to successive zones ($K_i$) obtained from the image detector as a scanning file.

17. A method according to claim 16, characterized in that the method further comprises, prior to the mutual fastening of the camera unit and the flush unit, the following steps:
- lowering the camera unit (1), comprising first automatic locking means (4a), at a first access sewage tank (11a) to the location of the pipe (10);
- holding said camera unit in place; and
- allowing the flush unit (8), comprising second automatic locking means (4b), to move by the recoil force (F) of the liquid jets ejected through the nozzles along the pipe (10) forwards to make contact with the camera unit and to be locked therein, to form said scanner combination (13).

18. A method according to claim 16, characterized in that the method further comprises the step of recording the scanning file in the semiconductor memory (M) provided in the camera unit (1) simultaneously as the circumferential zone ($K_i$) is transformed as an image in the image detector (S).

19. A method according to claim 16, characterized in that the method further comprises the following steps:
- removing the scanner combination (13) from the pipe; and
- reading the scanning file from the semiconductor memory (M) for further processing and/or display.

* * * * *